United States Patent
Yannakopoulos et al.

(10) Patent No.: US 7,948,984 B2
(45) Date of Patent: May 24, 2011

(54) DETECTING AN IDENTIFIER CHANGE OF AN ENDPOINT

(75) Inventors: Lisa Z. Yannakopoulos, Boxborough, MA (US); Brian P. Glanville, Shirley, MA (US)

(73) Assignee: Cisco Technology, Inc., San Jose, CA (US)

(*) Notice: Subject to any disclaimer, the term of this patent is extended or adjusted under 35 U.S.C. 154(b) by 387 days.

(21) Appl. No.: 11/623,621

(22) Filed: Jan. 16, 2007

(65) Prior Publication Data

US 2008/0170572 A1    Jul. 17, 2008

(51) Int. Cl.
*H04L 12/28* (2006.01)
(52) U.S. Cl. .................................. 370/392; 379/88.12
(58) Field of Classification Search .................. None
See application file for complete search history.

(56) References Cited

U.S. PATENT DOCUMENTS

| | | | |
|---|---|---|---|
| 5,621,790 A | 4/1997 | Grossman et al. | 379/266.08 |
| 5,815,566 A | 9/1998 | Ramot et al. | 379/210.01 |
| 6,226,375 B1 * | 5/2001 | Shaffer et al. | 379/142.17 |
| 6,845,096 B1 | 1/2005 | Hori et al. | 370/352 |
| 6,879,674 B2 | 4/2005 | Strandberg | 379/210.01 |
| 2002/0090069 A1 * | 7/2002 | Yaker | 379/88.17 |
| 2002/0141557 A1 | 10/2002 | Strandberg | 379/210.01 |
| 2004/0170258 A1 * | 9/2004 | Levin et al. | 379/88.01 |
| 2004/0234065 A1 * | 11/2004 | Anderson | 379/266.07 |
| 2004/0236679 A1 * | 11/2004 | Anderson | 705/39 |
| 2005/0074114 A1 * | 4/2005 | Fotta et al. | 379/266.08 |
| 2006/0083357 A1 * | 4/2006 | Howell et al. | 379/88.04 |
| 2007/0162542 A1 * | 7/2007 | Lawrence et al. | 709/203 |

* cited by examiner

*Primary Examiner* — Chirag G Shah
*Assistant Examiner* — Otis L Thompson, Jr.
(74) *Attorney, Agent, or Firm* — Baker Botts L.L.P.

(57) ABSTRACT

Detecting an identifier change of an endpoint includes dialing an identifier associated with an endpoint to initiate a call to the endpoint. A network indicator indicating a change of the identifier is detected. A new identifier associated with the endpoint is determined, and a record is updated to reflect the new identifier associated with the endpoint.

19 Claims, 2 Drawing Sheets

DETECTING AN IDENTIFIER CHANGE OF AN ENDPOINT

TECHNICAL FIELD

This invention relates generally to communication services, and more specifically, to detecting an identifier change of an endpoint.

BACKGROUND

Modern businesses may use contact centers to communicate large volumes of requests by telephone. Contact centers include dialers that automatically dial a telephone number on behalf of agents working at the contact center. The dialers, however, cannot handle certain situations. For example, if the dialers encounter a change in the telephone number, the dialers end the call.

SUMMARY OF THE DISCLOSURE

In accordance with the present invention, disadvantages and problems associated with previous techniques for detecting an identifier change may be reduced or eliminated.

According to one embodiment of the present invention, detecting an identifier change of an endpoint includes dialing an identifier associated with an endpoint to initiate a call to the endpoint. A network indicator indicating a change of the identifier is detected. A new identifier associated with the endpoint is determined, and a record is updated to reflect the new identifier associated with the endpoint.

Certain embodiments of the invention may provide one or more technical advantages. A technical advantage of one embodiment may be that a dialer may place a call to a new identifier if it encounters a change in an identifier. Therefore, dialers may make a call to the newly detected identifier without automatically ending the call after an initial attempt to the previous identifier.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
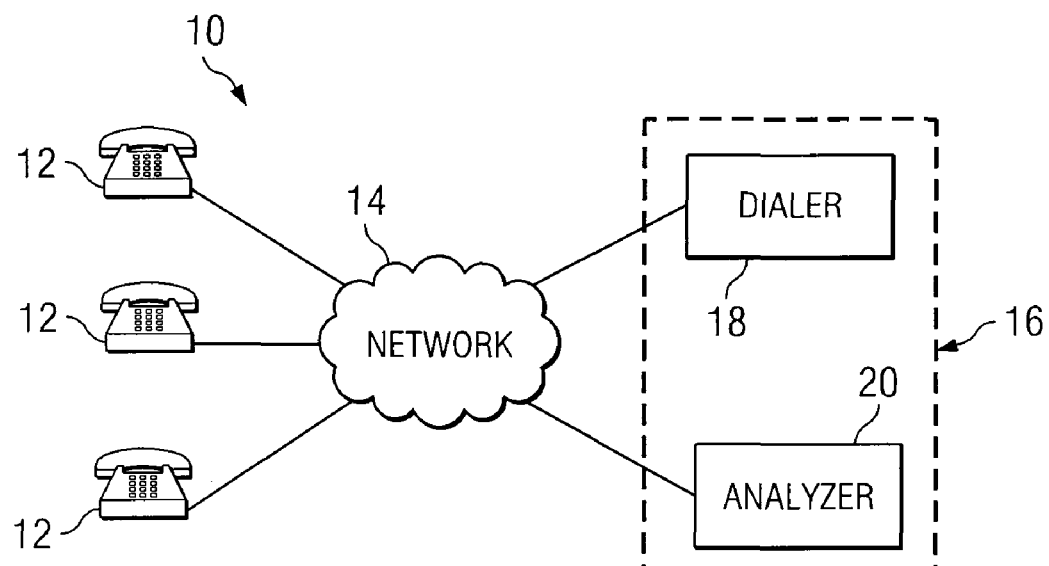
FIG. 1 is a block diagram of one embodiment of a system for detecting an identifier change.
Figure 2:
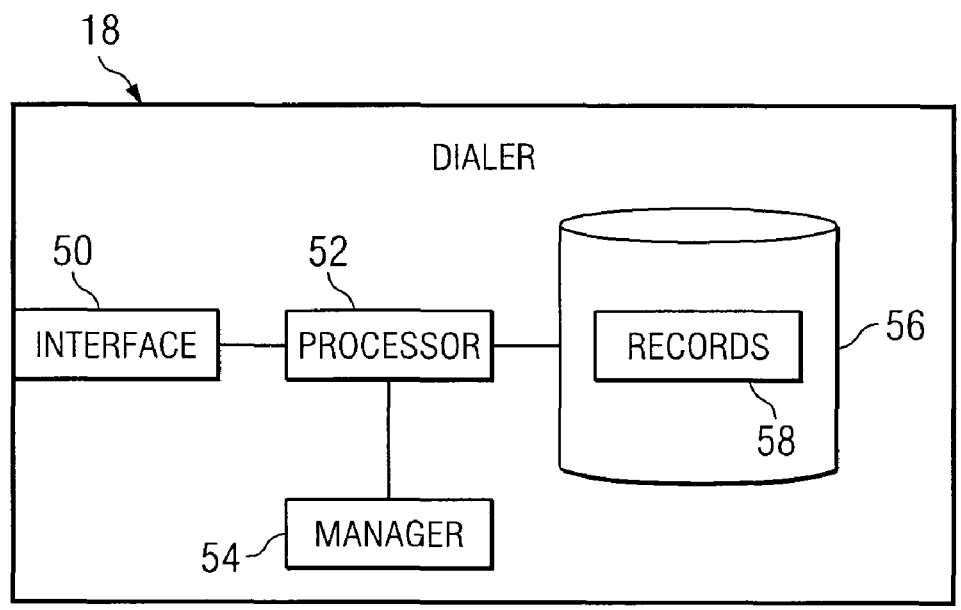
FIG. 2 is a block diagram illustrating an embodiment of a dialer that detects the identifier change.
Figure 3:
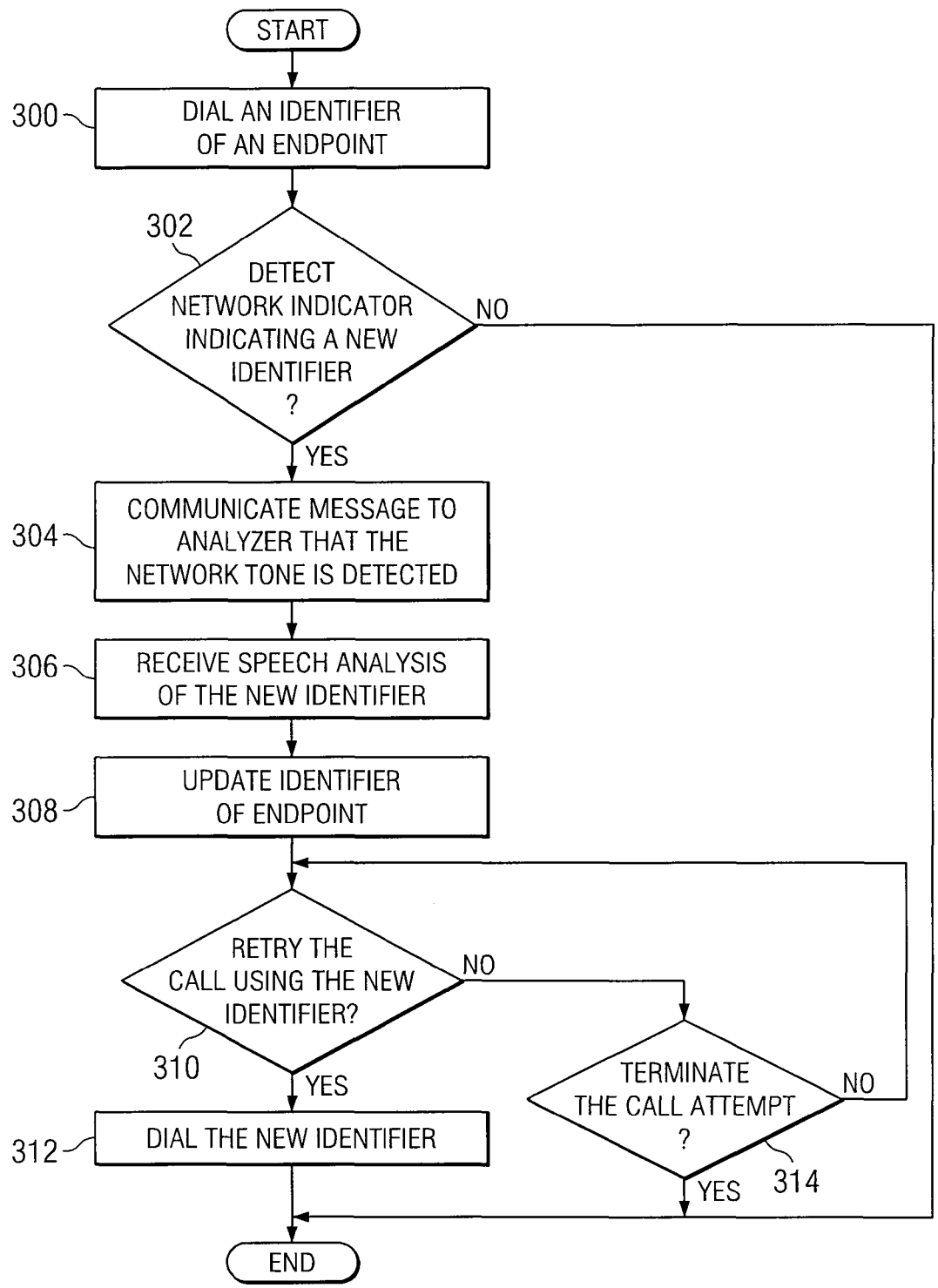
FIG. 3 is a flowchart illustrating one embodiment of a method for detecting the identifier change.

Embodiments of the present invention and its advantages are best understood by referring to FIGS. 1 through 3 of the drawings, like numerals being used for like and corresponding parts of the various drawings.

FIG. 1 is a block diagram of one embodiment of a system 10 for detecting an identifier change. System 10 includes endpoints 12 that communicate over a network 14 with a contact center 16. If an identifier of an endpoint 12 changes, contact center 16 detects the change and updates the old identifier with the new identifier.

System 10 includes any suitable number of endpoints 12 that communicate with other endpoints 12 and contact center 16. Each endpoint 12 is associated with an identifier that allows other components in system 10 to contact the user. For example, endpoint 12 is associated with a telephone number or an Internet Protocol (IP) address.

Endpoints 12 may communicate information such as data, audio, video, multimedia, any other suitable type of information, or any combination of the preceding. For example, endpoints 12 may participate in circuit-switched communication where voice information is communicated over a circuit, or endpoints 12 may participate in packet-based communication where voice information is communicated through packets. The communication may be in the form of a call, a message, or any other suitable form of communication.

Endpoints 12 may comprise, for example, a user of a communication device, a telephone, a wireless or cellular telephone, an IP telephone, a mobile handset, or any other endpoint suitable for communicating in system 10. Endpoints 12 may support, for example, IP, mobile IP, or any other suitable communication protocol.

Network 14 allows components of system 10 to communicate with other networks or other components of system 10. For example, network 14 facilitates communication between endpoints 12 and contact center 16. Network 14 may include at least a portion or one or more of the following: a public switched telephone network (PSTN), a metropolitan area network (MAN), a local area network (LAN), a wide area network (WAN), a local, regional, or global communication network, such as the Internet, other suitable wireline or wireless communication link, or any suitable combination of the preceding. Network 14 supports any suitable communication protocol, such as IP. Network 14 may include any combination of gateways, routers, hubs, switches, access points, base stations, and/or any other hardware and/or software that may implement any suitable protocol or communication.

Contact center 16 represents a centralized office that facilitates a large volume of communications with endpoints 12. For example, contact center 16 administers outgoing and/or incoming telephone calls for a telemarketing company, a debt collection company, a customer support department of a company, or any other suitable entity. As another example, contact center 16 may facilitate the collective handling of letters, faxes, e-mails, or any suitable combination of the preceding. Contact center 16 may be configured to run in any suitable mode, such as a blended mode for outgoing and incoming calls, a scheduled mode that handles outgoing calls for a period of time and handles incoming calls for a period of time, and/or a single mode that only handles outgoing or incoming calls. Agents at contact center 16 may conduct the communication with users of endpoints 12. Contact center 16 may include any suitable component to facilitate the communications. In the illustrated embodiment, call center 16 includes a dialer 18 and an analyzer 20.

Dialer 18 facilitates outgoing calls for agents in contact center 16. For example, dialer 18 may dial an identifier associated with the user of endpoint 12 on behalf of the agent in contact center 16. Dialer 18 includes any suitable components operable to facilitate calls to and from contact center 16. An example of dialer 18 is described in more detail with reference to FIG. 2.

According to one embodiment, dialer 18 may detect an identifier change of a user if the previous identifier has changed. If the identifier of endpoint 12 has changed, dialer 18 detects a network indicator that precedes a network message. The network message may be speech, text, or any other form of communication. The network indicator, such as a tone, trigger, or white noise, indicates the dialed identifier has changed, and the network message provides the new identifier. Dialer 18 communicates with analyzer 20 to determine the new identifier in the network message.

Analyzer 20 determines an identifier from a message. In one embodiment, analyzer 20 may identify the identifier from a network message that may use speech to inform callers of a new identifier. For example, if the identifier represents a telephone number, analyzer 20 may analyze the speech to determine the digits of the telephone number and may communicate the digits of the telephone number to dialer 18. Analyzer 20 may use automatic speech recognition (ASR) capabilities, text-to-speech (TTS) capabilities, other suitable speech translation capabilities, or any suitable combination of the preceding to detect the speech in the message and translate the speech into a form recognizable by dialer 18.

In an exemplary embodiment of operation, dialer 18 may be configured to initiate calls to endpoints 12 according to a schedule. For example, an agent working in contact center 16 may have a schedule of calls to complete, and dialer 18 may initiate the calls for the agent according to the schedule. Dialer 18 initiates an outgoing call to endpoint 12 by dialing a telephone number associated with endpoint 12. In this example, the dialed telephone number of endpoint 12 has changed to a new telephone number. Because of the change in telephone number, system 10 communicates a network indicator that indicates a new telephone number has replaced the dialed telephone number and communicates a network message that includes the new telephone number.

Dialer 18 detects the network indicator and communicates a message to analyzer 20 that the network indicator is detected. Analyzer 20 analyzes the network message to determine the digits of the new telephone number. Analyzer 20 communicates the new telephone number to dialer 18, and dialer 18 updates the telephone number associated with endpoint 12 and determines how to proceed using the new telephone number. For example, dialer 18 may dial the new telephone number immediately, or dialer 18 may dial the new telephone number after a configurable time period.

Modifications, additions, or omissions may be made to system 10 without departing from the scope of the invention. For example, dialer 18 and analyzer 20 may be combined into a single component that facilitates outgoing and incoming calls of contact center 16, determines a new telephone number that replaces a dialed telephone number, and analyzes speech in a network message to determine the new telephone number. As another example, system 10 may include a call manager that facilitates communication between network 14 and contact center 16. As yet another example, dialer 18 may detect an out-of-office message for endpoint 12. If the out-of-message includes a return-to-office date, dialer 18 may return the call according to the return-to-office date. Analyzer 20 may analyze the message to determine the necessary information for dialer 18 to return the call. As another example, dialer 18 may also detect alternative identifiers for out-bound calling that endpoint 12 may provide, such as an alternative identifier for the user or an identifier for an alternative user. Dialer 18 may include logic that recognizes an identifier for an alternative user. The logic may retrieve the identifier according to a role of the alternative user. As yet another example, dialer 18 may obtain the identifier of the alternative user and update its records with the new identifier. Moreover, the operations of system 10 may be performed by more, fewer, or other components. Any suitable logic comprising software, hardware, other logic embodied in a computer readable medium, or any suitable combination of the preceding may perform the functions of system 10.

FIG. 2 is a block diagram illustrating an embodiment of dialer 18 that detects the identifier change. Dialer 18 includes an interface 50, a processor 52, a manager 54, and memory 56 to facilitate the detection of an identifier change.

Interface 50 allows dialer 18 to exchange information with other elements of system 10, such as network 14. For example, interface 50 receives a network indicator from network 10 that indicates a new identifier for endpoint 12. Interface 50 represents any port or connection, real or virtual, including any suitable hardware, software, or a combination of the preceding that allows dialer 18 to exchange information in system 10.

Processor 52 executes instructions and manipulates data to perform operations of dialer 18. For example, processor 52 processes information received from interface 50, manager 54, and memory 56. Processor 52 includes any hardware, software, or both that operate to control and process information. For example, processor 52 may be a programmable logic device, a microcontroller, a microprocessor, any other suitable processing device, or any suitable combination of the preceding.

Manager 54 manages the operations of dialer 18. To manage the operations of dialer 18, manager 54 may maintain configuration information, manage a dialing schedule, determine the customer records to retrieve based on the dialing schedule, update customer records, perform any other suitable function to manage dialer 18, or perform any suitable combination of the preceding. For example, manager 54 may instruct dialer 18 how to respond to receiving the new identifier. Manager 54 may have dialer 18 immediately retry the new identifier, or manager 54 may have dialer 18 retry the new identifier after a configurable time period.

Memory 56 represents any suitable element operable to store data and to provide data for retrieval. Memory 56 maintains records 58 of customers and provides records 58 for retrieval. Memory 56 may also include information against which dialer 18 may check the new identifier to determine whether to retry the new identifier, such as a "Do Not Call List."

Records 58 represent any suitable data structures that maintain information associated with endpoints 12, users of endpoints 12, customers, other suitable entities, or any suitable combination of the preceding. Each record 58 may include any suitable information to allow dialer 18 to initiate an outgoing call to endpoint 12. For example, a record 58 includes the customer's name, the customer's address, and an identifier of an endpoint 12 that a customer uses, such as a telephone number. Record 58 may be updated if any element changes. For example, if a customer's telephone number changes, record 58 may be updated to reflect the change.

Modifications, additions, or omissions may be made to dialer 18. For example, dialer 18 may include analyzer 20 to analyze speech. As another example, manager 54 may be included in system 10 as a separate component. Additionally, any suitable logic comprising software, hardware, other logic, or any suitable combination of the preceding may perform the functions of dialer 18.

FIG. 3 is a flowchart illustrating one embodiment of a method for detecting the identifier change. The method begins at step 300 where dialer 18 dials an identifier of an endpoint 12. For example, dialer 18 may dial a telephone number associated with endpoint 12. At step 302, dialer 18 determines whether it detects a network indicator indicating a new identifier exists for endpoint 12. If dialer 18 does not detect a network indicator, the call may proceed using the dialed identifier, and the method ends.

If dialer 18 detects a network indicator, dialer 18 communicates a message to analyzer 20 at step 304 that the network indicator is detected. Dialer 18 may also detect a network message that includes the new identifier. Analyzer 20 analyzes the speech in the network message to determine the new identifier.

Dialer 18 receives the speech analysis of the network message at step 306, which includes the new identifier in a form understandable by dialer 18. For example, the speech analysis may include text. As another example, dialer 18 may receive the digits of a telephone number from analyzer 20 following the speech analysis of the network message. Dialer 18 updates the customer record with the new identifier at step 308.

At step 310, dialer 18 determines whether to retry the call using the new identifier. For example, dialer 18 may immediately retry the call or dialer 18 may wait any suitable period of time before retrying the call. As another example, dialer 18 may check a "Do Not Call List" to determine whether the new identifier is included before retrying the call. If dialer 18 determines to retry the call, dialer 18 dials the new identifier of the endpoint 12 at step 312, and the method ends.

If dialer 18 determines not to retry the call, dialer 18 determines whether to terminate the call attempt at step 314. If the call attempt is not terminated, the method continues from the determination of whether to retry the call. For example, if manager 54 configures dialer 18 to retry the call after a period of time, dialer 18 may recursively determine whether to retry the call until the time period expires. If the call attempt is terminated, the method subsequently ends.

Modifications, additions, or omissions may be made to the method without departing from the scope of the invention. For example, dialer 18 may perform the speech analysis itself without receiving the speech analysis from analyzer 20. In this example, dialer 18 would not communicate a message to analyzer 20 that the network indicator was detected. As another example, dialer 18 may not include a manager 54 and may communicate the new identifier to an external manager. The external manager may update the identifier in the appropriate customer record 56. As yet another example, dialer 18 may automatically dial the new identifier upon receiving the speech analysis, rather than determining whether to retry the call based on intelligence in manager 54. Although described in a particular sequence, the method may be performed serially or in parallel in any suitable order.

Certain embodiments of the invention may provide one or more technical advantages. A technical advantage of one embodiment may be that a dialer may place a call to a new identifier if it encounters a change in an identifier. Therefore, dialers may make a call to the newly detected identifier without automatically ending the call after an initial attempt to the previous identifier.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for detecting an identifier change, comprising:
   automatically performing, by an apparatus on behalf of an agent at a call center, the steps of:
   dialing an identifier associated with an endpoint to initiate a call to the endpoint;
   detecting a network indicator indicating a change of the identifier;
   detecting a network message comprising a new identifier and status information associated with a user of the endpoint, wherein the status information indicates availability of the user to receive the call;
   determining the new identifier and the status information associated with the endpoint from the network message;
   determining, from the network message comprising the status information, a return policy for the user, wherein the return policy comprises a return date;
   updating a record to reflect the new identifier associated with the endpoint;
   determining a new recipient associated with the new identifier from the network message;
   updating the record to reflect the new recipient associated with the new identifier;
   comparing the new identifier to a list of identifiers designated not to call;
   determining whether to retry the call to the endpoint, wherein determining whether to retry the call comprises determining whether the new identifier is eligible to receive the call according to the status information, the comparison to the list of identifiers designated not to call, and the return policy; and
   dialing the new identifier associated with the endpoint if it is determined to retry the call and if it is determined that the new identifier is eligible to receive the call.

2. The method of claim 1, further comprising dialing the new identifier associated with the endpoint.

3. The method of claim 1, further comprising:
   communicating the network message to an analyzer for analysis; and
   receiving the new identifier communicated in the network message.

4. The method of claim 1, wherein determining a new identifier associated with the endpoint comprises implementing automatic speech recognition (ASR) of a network message.

5. The method of claim 4, wherein determining a new identifier associated with the endpoint comprises implementing text-to-speech (TTS) translation of the network message.

6. The method of claim 1, wherein the identifier comprises a first telephone number and the new identifier comprise a second telephone number.

7. A non-transitory computer readable medium comprising logic for detecting an identifier change, the logic, when executed, operable to: cause an apparatus to automatically perform, on behalf of an agent at a call center, steps to:
   dial an identifier associated with an endpoint to initiate a call to the endpoint;
   detect a network indicator indicating a change of the identifier;
   detect a network message comprising a new identifier and status information associated with a user of the endpoint, wherein the status information indicates availability of the user to receive the call;
   determine the new identifier and the status information associated with the endpoint from the network message;
   determine, from the network message comprising the status information, a return policy for the user, wherein the return policy comprises a return date;
   update a record to reflect the new identifier associated with the endpoint;
   determine a new recipient associated with the new identifier from the network message;
   update the record to reflect the new recipient associated with the new identifier;
   compare the new identifier to a list of identifiers designated not to call;
   determine whether to retry the call to the endpoint, wherein determining whether to retry the call comprises determining whether the new identifier is eligible to receive the call according to the status information, the comparison to the list of identifiers designated not to call, and the return policy; and dial the new identifier associated with the endpoint if it is determined to retry the call and if it is determined that the new identifier is eligible to receive the call.

8. The computer readable medium of claim 7, further operable to dial the new identifier associated with the endpoint.

9. The computer readable medium of claim 7, further operable to:
communicate the network message to an analyzer for analysis; and
receive the new identifier communicated in the network message.

10. The computer readable medium of claim 7, wherein determining a new identifier associated with the endpoint comprises implementing automatic speech recognition (ASR) of a network message.

11. The computer readable medium of claim 10, wherein determining a new identifier associated with the endpoint comprises implementing text-to-speech (TTS) translation of the network message.

12. The computer readable medium of claim 7, wherein the identifier comprises a first telephone number and the new identifier comprise a second telephone number.

13. An apparatus for detecting an identifier change, comprising:
a dialer comprising:
a processor;
an interface; and
a memory;
the dialer operable to automatically, on behalf of an agent at a call center:
dial an identifier associated with an endpoint to initiate a call to the endpoint;
detect a network indicator indicating a change of the identifier; and
detect a network message comprising a new identifier and status information associated with a user of the endpoint, wherein the status information indicates availability of the user to receive the call; and
an analyzer operable to automatically, on behalf of the agent at the call center:
determine the new identifier and the status information associated with the endpoint according to the network message, wherein the dialer is further operable to automatically, on behalf of the agent at the call center:
determine, from the network message comprising the status information, a return policy for the user, wherein the return policy comprises a return date;
update a record to reflect the new identifier associated with the endpoint;
determine a new recipient associated with the new identifier from the network message;
update the record to reflect the new recipient associated with the new identifier;
compare the new identifier to a list of identifiers designated not to call;
determine whether to retry the call to the endpoint, wherein determining whether to retry the call comprises determining whether the new identifier is eligible to receive the call according to the status information, comparison to the list of identifiers designated not to call, and the return policy, and the dialer is further operable to dial the new identifier associated with the endpoint if it is determined to retry the call and if it is determined that the new identifier is eligible to receive the call.

14. The apparatus of claim 13, the dialer further operable to dial the new identifier associated with the endpoint.

15. The apparatus of claim 13, the dialer further operable to:
communicate the network message to the analyzer for analysis; and
receive the new identifier communicated in the network message from the analyzer.

16. The apparatus of claim 13, the analyzer further operable to implement automatic speech recognition (ASR) of a network message to determine the new identifier associated with the endpoint.

17. The apparatus of claim 16, the analyzer further operable to implement a text-to-speech translation of the network message to determine the new identifier associated with the endpoint.

18. The apparatus of claim 13, wherein the identifier comprises a first telephone number and the new identifier comprise a second telephone number.

19. A system for detecting an identifier change, comprising:
means for automatically dialing, on behalf of an agent at a call center, an identifier associated with an endpoint to initiate a call to the endpoint;
means for automatically detecting, on behalf of the agent, a network indicator indicating a change of the identifier;
means for automatically detecting, on behalf of the agent, a network message comprising a new identifier and status information associated with a user of the endpoint, wherein the status information indicates availability of the user to receive the call;
means for automatically determining, on behalf of the agent, the new identifier and the status information associated with the endpoint from the network message;
means for automatically determining, on behalf of the agent, from the network message comprising the status information, a return policy for the user, wherein the return policy comprises a return date;
means for automatically updating, on behalf of the agent, a record to reflect the new identifier associated with the endpoint;
means for automatically determining, on behalf of the agent, a new recipient associated with the new identifier from the network message;
means for automatically updating, on behalf of the agent, the record to reflect the new recipient associated with the new identifier;
means for automatically comparing, on behalf of the agent, the new identifier to a list of identifiers designated not to call;
means for automatically determining, on behalf of the agent, whether to retry the call to the endpoint, wherein determining whether to retry the call comprises determining whether the new identifier is eligible to receive the call according to the status information, the comparison to the list of identifiers designated not to call, and the return policy; and
means for automatically dialing, on behalf of an agent at a call center, the new identifier associated with the endpoint if it is determined to retry the call and if it is determined that the new identifier is eligible to receive the call.

* * * * *